(12) United States Patent
Medard et al.

(10) Patent No.: US 9,361,936 B2
(45) Date of Patent: *Jun. 7, 2016

(54) CODED SEEKING APPARATUS AND TECHNIQUES FOR DATA RETRIEVAL

(71) Applicant: Massachusetts Institute of Technology, Cambridge, MA (US)

(72) Inventors: Muriel Medard, Belmont, MA (US); Ulric J. Ferner, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/668,185

(22) Filed: Mar. 25, 2015

(65) Prior Publication Data

US 2015/0348584 A1 Dec. 3, 2015

Related U.S. Application Data

(63) Continuation of application No. 13/965,645, filed on Aug. 13, 2013, now Pat. No. 9,019,643.

(60) Provisional application No. 61/788,746, filed on Mar. 15, 2013.

(51) Int. Cl.
*G11B 5/02* (2006.01)
*G11B 20/10* (2006.01)
*G11B 20/12* (2006.01)
*G11B 27/10* (2006.01)

(52) U.S. Cl.
CPC .......... *G11B 20/10481* (2013.01); *G11B 20/10* (2013.01); *G11B 20/1217* (2013.01); *G11B 27/105* (2013.01); *G11B 2020/10916* (2013.01)

(58) Field of Classification Search
None
See application file for complete search history.

(56) References Cited

U.S. PATENT DOCUMENTS

| 5,577,056 | A | 11/1996 | Malik et al. |
| 6,128,773 | A | 10/2000 | Snider |
| 6,621,851 | B1 | 9/2003 | Agee et al. |
| 6,885,653 | B2 | 4/2005 | Choi et al. |

(Continued)

FOREIGN PATENT DOCUMENTS

| EP | 1 638 239 A1 | 3/2006 |
| WO | WO 2007/109216 A1 | 9/2007 |

(Continued)

OTHER PUBLICATIONS

U.S. Appl. No. 13/654,953, filed Oct. 18, 2012, Zeger, et al.

(Continued)

*Primary Examiner* — Regina N Holder
(74) *Attorney, Agent, or Firm* — Daly, Crowley, Mofford & Durkee, LLP

(57) ABSTRACT

Data blocks to be stored on a disk-based data storage device (e.g., a hard disk drive, etc.) are coded together to form a plurality of linearly independent network coded blocks. The network coded blocks are then stored on the data storage device. Coded seeking may then be used to retrieve the original data blocks from the data storage device in a time-efficient manner. A read request may be sent to the data storage device requesting an innovative coded packet associated with the original data blocks. In response to the read request, the data storage device may read an innovative coded packet from the disk that is closest to current position of a read element of the device.

13 Claims, 7 Drawing Sheets

(56) References Cited

U.S. PATENT DOCUMENTS

| | | |
|---|---|---|
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 2003/0028719 A1 | 2/2003 | Rege |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1 | 11/2005 | Ramesh et al. |
| 2006/0020560 A1 | 1/2006 | Rodriguez et al. |
| 2006/0146791 A1 | 7/2006 | Deb et al. |
| 2006/0224760 A1 | 10/2006 | Yu et al. |
| 2007/0046686 A1 | 3/2007 | Keller |
| 2007/0116027 A1 | 5/2007 | Ciavaglia et al. |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0210640 A1 | 8/2009 | Davis |
| 2009/0238097 A1 | 9/2009 | Le Bars et al. |
| 2009/0248898 A1 | 10/2009 | Gkantsidis et al. |
| 2009/0285148 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1 | 1/2010 | Jiang |
| 2010/0046371 A1 | 2/2010 | Sundararajan et al. |
| 2010/0057636 A1 | 3/2010 | Brennan |
| 2010/0111165 A1 | 5/2010 | Kim et al. |
| 2010/0146357 A1 | 6/2010 | Larsson |
| 2011/0238855 A1 | 9/2011 | Korsunsky et al. |
| 2012/0057636 A1 | 3/2012 | Tian et al. |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/025362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
Acedanski, et al.; "How Good is Random Linear Coding Based Distributed Network Storage?;" Proc. 1$^{st}$ Workshop on Network Coding, Theory, and Applications (Netcod'05); Apr. 2005; 6 pages.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Coughlin, et al.; Years of Destiny: HDD Capital Spending and Technology Developments from 2012-2016; IEEE Santa Clara Valley Magnetics Society; Jun. 19, 2012; pp. 1-28.
Ferner, et al.; "Toward Sustainable Networking: Storage Area Networks with Network Coding;" Proc. Allerton Conf. on Comm., Control and Computing; Oct. 2012; 8 pages.
Galbraith, et al.; (HGST); "Iterative Detection Read Channel Technology in Hard Disk Drives;" Whitepaper; Nov. 2008; 8 pages.
Hassner, et al.; "4K Bye-Sector HDD-Data Format Standard;" Windows Hardware and Driver Central; San Jose, CA; Aug. 14, 2013; 5 pages.
Hofri; "Disk Scheduling: FCFS vs. SSTF Revisited;" Communications of the ACM; vol. 23; No. 11; Nov. 1980; pp. 645-653.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Kim, et al.; "Transform-free analysis of the GI/G/1/K queue through the decomposed Little's formula;" Computers and Operations Research; vol. 30; No. 3; Mar. 2003; pp. 1-20.
Koetter, et al.; "An Algebraic Approach to Network Coding;" IEEE/ACM Transactions on Networking; vol. 11; No. 5; Oct. 2003; pp. 782-795.
Lee, et al.; "Content Distribution in VANETs using Network Coding: The Effect of Disk I/O and Processing O/H;" Proc, IEEE SECON; Jan. 2008; pp. 117-125.
Merchant, et al.; "Analytic tvlodeling of Clustered RAID with Mapping Based on Nearly Random Permutation;" IEEE Transactions on Computers; vol. 45; No. 3; Mar. 1996; pp. 367-373.
Popovici, et al.; "Robust, Portable I/O Scheduling with the Disk Mimic;" Proc. USENIX Annual Tech. Conf. San Antonio, Texas, Jun. 2003; 1-4 pages.
Ruemmler, et al.; "An introduction to disk drive modeling;" IEEE Computers; vol. 27; No. 3; Mar. 17-29, 1994; 17 pages.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; pp. 182-191.

(56) References Cited

OTHER PUBLICATIONS

Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
"Data Service Options for Spread Spectrum Systems; Radio Link Protocol Type 3;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings; MILCOM 2000; vol. 2.; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch; et al.; "On-Line Generalized Steiner Problem;" Proceedings of the 7$^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc. 38$^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Proc. of the 25$^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunication Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" 7$^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the 5$^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the 9$^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et ai.: "FEC and Pseudo-ARQ for Receiver-driven Layered Muiticast of Audio and Video," Data Compression Conference (DCC), 2000; Proceedngs; Jan. 2000; 10 pages.
Chou, et al.; "Practical: Network Coding;" Proceedings of the 41$^{st}$ Annual Allerton Conference on Communicaton, Control, and Computing; Oct. 2003; 10 pages.
Cisco Visual Networking Index: Forecast and Methodology; 2009-2014; White Paper; Jun. 2; 2010; pp. 1-17.
Cloud, et al.; "Co-Designing Muiti-Packet Reception, Network Coding: and MAC Using a Simple Predictive Model;" arXiv:1101.5770v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput," IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.

(56) References Cited

OTHER PUBLICATIONS

Costa, et al.; "Informed Network Coding for Minimum Decoding Delay;" Fifth IEEE International Coference on Mobile Ad-hoc and Sensor Systems; Sep. 2008; pp. 80-91.

Coughlin, et al.; Years of Destiny: HDD Capital Spending and Technology Developments from 2012-2016; IEEE Santa Clara Vailey Magnetics Society; Jun. 19, 2012; pp. 1-28.

Dana, et al.; "Capacity of Wireless Erasure Networks;" IEEE Transactions on Information Theory; vol. 52; No. 3; Mar. 2006; pp. 780-804.

Dana, et al.; "Capacity of Wireless Erasure Networks;" Jan. 2006; 41 pages.

Deb, et al.; "Algebraic Gossip: A Network Coding Approach to Optimal Multltple Rumor Mongering;" Proc. of the $42^{nd}$ Allerton Conference on Communication, Control, and Computing; Jan. 2004:10 pages.

Deb; et al.; "On Random Network Coding Based Information Dissemination;" Proc. of the IEEE International Symposium on Information Theory (ISIT); Sep. 4-9, 2005; 5 pages.

Demers, et al.; "Epidemic Algorithms for Replicated Database Maintenance;" PODC '87 Proceedings of the sixth annual ACM Symposium on Principles of distributed computing; Jan. 1987; pp. 1-12.

Dias, et al.; "Performance Anaiysis of HARQ in WiMax Networks Considering Imperfect Channel Estimaton;" The $7^{th}$ International Telecommunications Symposium (ITS 2010); 2010; 5 pages.

Dimakis, et al.; "A Survey on Network Codes for Distributed Storage;" Proceedings of the IEEE; vol. 99; No. 3; Mar. 2011; pp. 476-489.

Dimakis, et al.; "Network Coding for Distributed Storage Systems;" IEEE/ACM Transactions on Information Theory; vol. 56; No. 9; pp. 1-13.

Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.

Effros; Distortion-Rate Bounds for Fixed-and Variable-Rate Multiresolution Source Codes; IEEE Transactions on Information Theory; vol. 45, No. 6; Sep. 1999; pp. 1887-1910.

Effros; "Universal Multiresolution Source Codes;" IEEE Transactions on Information Theory; vol. 47; No. 6; Sep. 2001; pp. 2113-2129.

El Bahri, et al.; "Performance Comparison of Type I, II, and III Hybrid ARQ Schemes over AWGN Channels;" 2004 IEEE International Conference on Industrial Technology (ICIT); vol. 3; Dec. 8-10, 2004; pp. 1417-1421.

Eryilmaz, et al.; On Delay Performance Gains From Network Coding; Information Sciences and Systems; 2006 $40^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling;" Communication, Control, and Computing; 2010; $48^{th}$ Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" $47^{th}$ Annual Allerton Conference, IEEE; Sep. 30, 2009; pp. 447-454.

Feizi, et al; "Cases Where Finding a Minimum Entropy Coloring of a Characteristic Graph is a Polynomial Time Problem;" IEEE International Symposium on Information Theory; Jun. 13, 2010; pp. 116-120.

Ferner, et al; "Toward Sustainable Networking: Storage Are Networks with Network Coding;" Fiftieth Annual Allerton Conference; IEEE; Oct. 1-5, 2012; pp. 517-524.

Ford; "Architectural Guidelines for Multipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges;" MILCOM; Oct. 2007; 8 pages.

Frossard, et al.; "Media Streaming With Network Diversity;" Invited Paper; Proceedings of the IEEE; vol. 96, No. 1; Jan. 2008; pp. 39-53.

Garcia-Luna-Aceves; "Challenges: Towards Truly Scalable Ad Hoc Networks;" MobiCom 2007; Sep. 2007; pp. 207-214.

Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.

Ghaderi, et al.; Reliability of Network Coding in Lossy Wireless Networks; Infocom 2008; The $27^{th}$ Conference on Computer Communications IEEE; Apr. 13-18, 2008; 5 pages.

Gheorghiu, et al.; "Multipath TCP with Network Coding for Wireless Mesh Network;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Ghez, et al.; "Stability Properties of Slotted Aloha with Multipacket Reception Capability;" IEEE Transactions on Automatic Control; vol. 33; No. 7; Jul. 1988; pp. 640-649.

Gkantsidis, et al.; "Cooperative Security for Networking Coding File Distribution;" Proc. IEEE Infocom; Apr. 2006; 13 pages.

Gollakota, et al.; "ZigZag Decoding: Combating Hidden Terminals in Wireless Networks;" SIGCOMM 08; Aug. 17-22; pp. 159-170.

Golrezael, et al.; "FemtoCaching: Wireless Video Content Delivery Through Distributed Caching Helpers;" arXiv:1109.4179v2; Apr. 7, 2012; pp. 1-11.

Grant, et al.; "Graph Implementation for Nonsmooth Convex Programs;" LNCIS 371; Springer-Verlag Limited; Jan. 2008; pp. 95-110.

Gupta; "The Capacity of Wireless Networks;" IEEE Transactions on Information Theory; vol. 46; No. 2; Mar. 2000; pp. 388-404.

Hadzi-Velkov, et al.; "Capture Effect in IEEE 802.11 Basic Service Area Under Influence of Rayleigh Fading and Near-Far Effect;" IEEE; PIMRC 202; vol. 1; Sep. 2002; 5 pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. of the $43^{rd}$ Symposium on Theory of Computing (STOC); Jan. 2011, 13 pages.

Haeupler, et al.; "Optimality of Network Coding in Packet Networks;" ArXiv, Feb. 17, 2011; 5 pages.

Harley, et. al.; "Reversible Low-Density Parity-Check Codes;" IEEE Transactions on Information Theory; vol. 55; No. 5; May 2009; pp. 2016-2036.

Halloush, et al.; "Network Coding with Multi-Generation Mixing: Analysis and Applications for Video Communication;" IEEE International Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Network Coding for Security;" IEEE Military Communications Conference; Oct. 2007; pp. 1-6.

Ho, et al.; "A Random Linear Network Coding Approach to Multicast;" IEEE Transactions on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al; "Networking Coding from a Network Flow Perspective;" ISIT; Jun.-Jul. 2003; 6 pages.

Ho, et al.; "On Randomized Network Coding;" Proceedings of $41^{st}$ Annual Allerton Conference on Communications, Control and Computing; Oct. 2003; 10 pages.

(56) References Cited

OTHER PUBLICATIONS

Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hong, et al.; Network-coding-based hybrid ARQ scheme for mobile relay networks; Electronics Letters; vol. 46; No. 7; Apr. 1, 2010; 2 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM Sig-Comm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentaton; SIGCOMM 07; Aug. 27-31, 2007; 25 pages.
Jannaty, et al.; "Full Two-Dimiansional Markov Chain Analysis of Thermal Soft Errors in Subthreshold Nanoscale CMOS Devices;" IEEE Transactions on Device and Materials Reliabiiity; vol. 11; No. 1; Mar. 2011 ; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin et al.; "Is Random Network Coding Helpful in WiMax;" IEEE 27$^{th}$ Conference on Computer Communcations; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Scence; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in The Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The 43$^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the 5$^{th}$ International ICST Conference on Performance Evaluation Methodologies and Tools; May 16-20, 2011; 10 pages.
Kim, et al.; "Modeling Network Coded TCP Throughout: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Modeling Network Coded TCP Throughput: A Simple Model and its Validation", arXiv: 1008.0420v1 [cs.IT] Aug. 2, 2010; 9 pages.
Kim, et al; "Modeling Network Coded TCP Throughput: A Simple Model and its Validation"; Nov. 2010, Presentation; 19 pages.
Kodialam, et al.; "Online Multicast Routing With Bandwidth Guarantees: A New Approach Using Muiticast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding;" Distributed Computing Systems (ICDCS); 2011 31$^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the 42$^{nd}$ Symposium on Theory of Computing (STOC); Jun. 5-8, 2010; 10 pages.
Lai, "Sequential Analysis: Some Classical Problems and New Challenges", Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE 63$^{rd}$; vol. 4; May 7-10, 2006; pp. 2052-2057.
Larsson; "Analysis of Multi-User ARQ with Multiple Unicast Flows Under Non-lid Reception Probabilities;" Wireless Cotrmunication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The 27$^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedngs of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li et al.; "Robust and Flexible Scalable Video Multicast with Network Coding over P2P Network;" 2$^{nd}$ International Congress on Image and Signal Processing, IEEE: Oct. 17, 2009; pp. 1-5.
Li, et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and Its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

(56) References Cited

OTHER PUBLICATIONS

Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland; Conference; NetCod 2009, Lausanne, Switzerland; Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On Coding for Delay New Approaches based on Network Coding in Networks with Large Latency;" Conference ITA Workshop, San Diego, USA; Slide Presentaton; Feb. 13, 2009; 11 pages.
Lucani et al; "Random Linear Network Coding for Time Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding for Time-Division Duplexing: Field Size Considerations;" Conference: GLOBECOM 2009, Hawaii, USA; Dec. 2009; 6 pages.
Lucani, et al.; "Network Coding for Data Dissemination: It is Not What You Know, But What Your Neighbors Don't Know;" Modeling and Optimization in Mobile, AdHoc, and Wireless Networks 2009; WiOPT 2009; 7th International Symposium on Jun. 23-27, 2009; pp. 1-8.
Lucani, et al.; "Network Coding Schemes for Underwater Networks;" WUWNet 07; Sep. 14, 2007; pp. 25-32.
Lucani, et al.; Systematic Network Coding for Time-Division Duplexing; Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. of the 44th Allerton Conference on Communication, Control, and Computing; Sep. 2006; 10 pages.
Médard, et al.; "On Coding for Non-Multicast Networks;" invited paper, 41st Allerton Annual Conference on Communication, Control;
Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 267-373.
Metzner; "An Improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families of Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns/; Mar. 21, 2011; 3 pages.
Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008.
ParandehGheibl, et al.; "Access-Network Association Policies for Media Streaming in Heterogenous Environments;" Apr. 2010; pp. 1-8.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popovici, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE 20th International Symposium on Sep. 13-16, 2009; 5 pages.
Radunovic, et al.; "Horizon: Balancing TCP Over Multiple Paths in Wireless Mesh Network;" Proc. 14th ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Rezaee, et al.; "Multi Packet Reception and Network Coding;" Presentastion at The 2010 Military Communications Conference Unclassified Technical Program; Nov. 2, 2010; 15 pages.
Rezaee, et al.; "An Analysis of Speeding Multicast by Acknowledgement Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.
Rezaee, et al.; "Speeding Multicast by Acknowledgement Reduction Technique (SMART);" ArXiv:1104.2941v2 [cs.NI] Sep. 10, 2011; 6 pages.
Rezaee, et al.; "Speeding Multicast by Acknowledgement Reduction Technique (SMART) Enabling Robustness of QoE to the Number of Users;" IEEE Journal on Selected Areas in Communication; vol. 30, No. 7; Aug. 2012; pp. 1270-1280.

(56) References Cited

OTHER PUBLICATIONS

Rezaee, et al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.

Roughgarden, et al.; "How Bad is Selfish Routing?" Journal of the ACM; vol. 49, No. 2; Mar. 2002; pp. 236-259.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" $15^{th}$ ACM Symposium on Parallel Algorithms and Architectures; Jun. 2003; pp. 1-9.

Sayenko, et al.; "Performance Analysis of the IEEE 802.16 ARQ Mechanism;" MSWIM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless;" Packet Video; November 2007; 10 pages.

Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 pages.

Servetto, et al.; "Constrained Random Walks on Random Graphs: Routing Algorithms for Large Scale Wireless Sensor Networks;" WSNA 02; Sep. 28, 2002; 10 pages.

Shenker, et al.; "Pricing in computer networks: reshaping the research agenda;" Telecommunications Policy; vol. 20, No. 3; Jan. 1996; pp. 183-201.

Sherali, et al.; "Recovery of primal solutions when using subgradient optimization methods to solve Lagrangian duals of linear programs;" Elsevier Operations Research Letters 19 (Jan. 1996); pp. 105-113.

Shields; "The Interactions Between Ergodic Theory and Information Theory;" IEEE Transactions on Information Theory, vol. 44, No. 6; Oct. 1998; pp. 2079-2093.

Shrader, et al.; "Systematic wireless network coding;" Military Coference, 2009; MILCOM 2009; IEEE; 7 pages.

Shrader, et al; "Routing and Rate Control for Coded Cooperation in a Satellite-Terrestrial Network;" IEEE; The 2011 Military Communications Conference—Track 2—Network Protocols and Performance; Nov. 7-10, 2011; pp. 735-740.

Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.

Song, et al.; "Zero-Error Network Coding for Acyclic Networks;" IEEE Transactions on Information Theory; vol. 49, No. 12; Dec. 2003; pp. 3129-3139.

SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.

Soo Suh; "Send-On-Delta Sensor Data Transmission With a Linear Predictor;" Sensors; ISSN 1424-8220; vol. 7; No. 4; Apr. 26, 2007; pp. 537-547.

Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.

Sundaram, et al.; "Multirate Media Streaming Using Network Coding;" Proc. $43^{rd}$ Allerton Conference on Communication, Control, and Computing; Sep. 2005; 7 pages.

Sundararajan, et al.; "ARQ for Networking Coding;" ISIT Proc. of the IEEE International Symposium on Information Theory (ISIT); Jul. 6-11, 2008; pp. 1651-1655.

Sundararajan, et al.; "Network Coding Meets TCP: Theory and Implementation;" Proceedings of the IEEE; vol. 99, Issue 3; Mar. 2011; pp. 490-512.

Sundararajan, et al.; "Network coding meets TCP;" InfoCOM 2009; IEEE, Apr. 19-25, 2009; pp. 280-288.

Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.

Teerapittayanon, et al.; "Network Coding as a WiMAX Link Reliability Mechanism;" Multiple Access Communication; Lectures Notes in Computer Science; vol. 7642; pp. 1-12; 2012.

Teerapittayanon, et al.; "Performance Enhancements in Next Generations Wireless Networks Using Network Coding: A Case Study in WiMAX;" Massachusetts Institute of Technology; Jun. 2012; 130 pages.

Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.

Tosun, et al.; "Efficient Multi-Layer Coding and Encryption of MPEG Video Streams;" Proc. 2000 IEEE International Conference on Multimedia and Expo; vol. 1; 2000; pp. 119-122.

Tosun, et al.; "Lightweight Security Mechanisms for Wireless Video Transmission;" Proc. Intl. Conference on Information Technology, Coding and Computing; Apr. 2001; pp. 157-161.

Tran, et al.; "A Hybrid Network Coding Technique for Single-Hop Wireless Networks;" IEEE Journal on Selected Areas in Communications; vol. 27; No. 5; Jun. 2009; pp. 685-698.

Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.

Trung, et al.; "Quality Enhancement for Motion JPEG Using Temporal Redundancies;" IEEE Transactions on Circuits and System for Video Technology, vol. 18; No. 5; May 2008; pp. 609-619.

Tsatsanis, et al.; "Networks Assisted Diversity for Random Access Wireless Data Networks;" Signals, Systems & amp; Computers; IEEE; vol. 1; Nov. 1-4, 1988; pp. 83-87.

Valancius, et al.; "Greening the Internet with Nano Data Centers;" Proc. $5^{th}$ International Conference on Emerging Networking Experiments and Technologies; CoNEXT 2009; ACM 2009; Dec. 1-4, 2009; pp. 37-48.

Vasudevan, et al.; "Algebraic Gossip on Arbitrary Networks;" arXiv:0901.1444; Jan. 2009; 5 pages.

Velambi, et al.; "Throughput and Latency in Finite-Buffer Line Networks;" IEEE Transactions on Information Theory; vol. 57; No. 6; Jun. 2011; pp. 3622-3643.

Vien, al.; "Network Coding-based Block ACK for Wireless Relay Network;" Proceedings of IEEE Vehicular Technology Conference (VTC2011-Spring); May 2011; 5 pages.

Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.

Vilela, et al.; "Lightweight Security for Network Coding;" IEEE International Conference on Communications; May 2008; 5 pages.

Wang, et al.; "Capacity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; April 2008; pp. 1517-1525.

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.

Widmer, et al.; "Network Coding for Efficient Communication in Extreme Networks;" Applications, Technologies, Architectures, and Protocols for Computer Communication; Aug. 2005; pp. 284-291.

(56) References Cited

OTHER PUBLICATIONS

Wieselthier, et al.; "Energy Efficient Broadcast and Multicast Trees in Wireless Networks;" Mobile Networks and Applications 7; Jan. 2002; pp. 481-492.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access," Communications of the ACM, vol. 19; No. 1; Jan. 1976; pp. 13-17.
Wu et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactons on Communication; vol. 50; No. 1; Jan. 2002; pp. 146-155.
Zhang, et al.; "Optmized Multipath Network Coding in Loss Wirless Networks;" ICDCS '08 Proceedings of the 2008 The 28$^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Networks Coding in Application-Layer Overlay Networks;" IEEE Journal on Selected Areas in Communications; vol. 22; No. 1; Jan. 2004; pp. 1-13.
PCT Search Report of the ISA for PCT/US14/24368 dated Aug. 1, 2014 3 pages.
PCT Written Opinion of the ISA for PCT/US14/24368 dated Aug. 1, 2014 6 pages.
U.S. Appl. No. 13/965,645, filed Aug. 13, 2013; Part 1 of 25; 200 pages.
U.S. Appl. No. 13/965,645, filed Aug. 13, 2013; Part 2 of 25; 200 pages.
U.S. Appl. No. 13/965,645, filed Aug. 13, 2013; Part 3 of 25; 200 pages.
U.S. Appl. No. 13/965,645, filed Aug. 13, 2013; Part 4 of 25; 100 pages.
U.S. Appl. No. 13/965,645, filed Aug. 13, 2013; Part 4A of 25; 100 pages.
U.S. Appl. No. 13/965,645, filed Aug. 13, 2013; Part 5 of 25; 200 pages.
U.S. Appl. No. 13/965,645, filed Aug. 13, 2013; Part 6 of 25; 100 pages.
U.S. Appl. No. 13/965,645, filed Aug. 13, 2013; Part 6A of 25; 100 pages.
U.S. Appl. No. 13/965,645, filed Aug. 13, 2013; Part 7 of 25; 200 pages.
U.S. Appl. No. 13/965,645, filed Aug. 13, 2013; Part 8 of 25; 200 pages.
U.S. Appl. No. 13/965,645, filed Aug. 13, 2013; Part 9 of 25; 200 pages.
U.S. Appl. No. 13/965,645, filed Aug. 13, 2013; Part 10 of 25; 200 pages.
U.S. Appl. No. 13/965,645, filed Aug. 13, 2013; Part 11 of 25; 200 pages.
U.S. Appl. No. 13/965,645, filed Aug. 13, 2013; Part 12 of 25; 200 pages.
U.S. Appl. No. 13/965,645, filed Aug. 13, 2013; Part 13 of 25; 200 pages.
U.S. Appl. No. 13/965,645, filed Aug. 13, 2013; Part 14 of 25; 100 pages.
U.S. Appl. No. 13/965,645, filed Aug. 13, 2013; Part 14A of 25; 100 pages.
U.S. Appl. No. 13/965,645, filed Aug. 13, 2013; Part 15 of 25; 200 pages.
U.S. Appl. No. 13/965,645, filed Aug. 13, 2013; Part 16 of 25; 200 pages.
U.S. Appl. No. 13/965,645, filed Aug. 13, 2013; Part 17 of 25; 200 pages.
U.S. Appl. No. 13/965,645, filed Aug. 13, 2013; Part 18 of 25; 200 pages.
U.S. Appl. No. 13/965,645, filed Aug. 13, 2013; Part 19 of 25; 200 pages.
U.S. Appl. No. 13/965,645, filed Aug. 13, 2013; Part 20 of 25; 200 pages.
U.S. Appl. No. 13/965,645, filed Aug. 13, 2013; Part 21 of 25; 200 pages.
U.S. Appl. No. 13/965,645, filed Aug. 13, 2013; Part 22 of 25; 200 pages.
U.S. Appl. No. 13/965,645, filed Aug. 13, 2013; Part 23 of 25; 200 pages.
U.S. Appl. No. 13/965,645, filed Aug. 13, 2013; Part 24 of 25; 200 pages.
U.S. Appl. No. 13/965,645, filed Aug. 13, 2013; Part 25 of 25; 4 pages.
U.S. Appl. No. 14/297,090, filed Jun. 5, 2014, Kim, et al.
U.S. Appl. No. 14/678,359, filed Apr. 3, 2015, Zeger, et al.
U.S. Appl. No. 14/882,115, filed Aug. 10, 2015, Lima, et al.
U.S. Appl. No. 14/843,358, filed Sep. 2, 2015, Haupler, et al.
U.S. Appl. No. 14/826,256, filed Aug. 14, 2015, Zeger, et al.
International Preliminary Report on Patentability of the ISA for PCT/US2014/024368 dated Sep. 15, 2015.

CODED SEEKING APPARATUS AND TECHNIQUES FOR DATA RETRIEVAL

CROSS REFERENCE TO RELATED APPLICATION

This application is a continuation of co-pending U.S. application Ser. No. 13/965,645 filed Aug. 13, 2013 which claims the benefit of U.S. Provisional Application No. 61/788,746 flied on Mar. 15, 2013, both of which are incorporated by reference herein in their entireties.

GOVERNMENT RIGHTS

This invention was made with government support under Contract No. FA9550-09-1-0196 awarded by the Air Force Office of Scientific Research and under Contract No. W911NF-07-1-0029 awarded by the Army Research Office. The government has certain rights in the invention.

FIELD

Subject matter disclosed herein relates generally to data storage and, more particularly, to techniques and systems for increasing data access speeds in a data storage device using coding.

BACKGROUND

The hard disk drive has been a staple of data storage networks for some time. In the last two decades, the cost of hard disk drives has steadily decreased while the density of data stored on these drives has increased significantly, yielding cheaper and higher capacity storage devices. Solid state storage devices have also become increasingly popular, especially in portable devices, owing to certain performance benefits. For example, the lack of moving parts in solid state drives allows data read times to be relatively constant across the device. In addition, there is no physical read-head bottleneck in solid state drives. Conversely, the physical movement of actuators, read/write heads, and platters in hard disk drives can result in access times for a single block of data that can be on the order of a few milliseconds to tens of milliseconds in many instances. As such, hard disk drives can create bottlenecks in modern input/output (I/O) systems.

The bottlenecks associated with hard disk drives have motivated the development of numerous I/O latency reduction algorithms for such drives. These algorithms include, for example, read-ahead algorithms and more complex variants thereof. Typically, these algorithms rely on scheduling schemes that predict and exploit common access patterns. However, such algorithms are failing to keep up with growing demands for I/O access speed increases.

There is a general need for techniques that are capable of reducing average access times in hard disk drives and other data storage devices that have moving mechanical parts.

SUMMARY

In various embodiments described herein, techniques and systems are provided that use coding to reduce average access times in data storage devices that have moving mechanical parts (e.g., hard disk drives and other disk-based data storage devices). In at least one embodiment, a simple internal coding scheme is provided for disk-based data storage devices and systems that uses coding across drive blocks to reduce average block read times. Coded seeking may then be employed to read data from the data storage device in a rapid and efficient manner. In a conventional disk drive, a drive controller will typically seek and retrieve an individual data block from a disk or platter in response to a read request (e.g., a data block stored at a particular sector on the disk). Using coded seeking, the controller may instead identify and retrieve an innovative coded block that is closest to the position of a read head in response to a read request. That is, for each request that arrives at a disk controller, the controller may seek one of many coded data blocks that contain useful information that is closest to the current read head position, in a manner that reduces average physical drive movement. In this fashion, average seek times of individual data blocks can be reduced.

In accordance with one aspect of the concepts, systems, circuits, and techniques described herein, a method is provided for use in retrieving data from a disk-based data storage device having multiple network coded blocks stored therein that are associated with a plurality of native data blocks. More specifically, the method comprises: receiving a read request requesting retrieval of an innovative coded block associated with the plurality of native data blocks; identifying, in response to the read request, an innovative coded block stored in the disk-based data storage device that is closest to a present position of a read transducer of the disk-based data storage device; and reading the identified innovative coded block.

In one embodiment, the multiple network coded blocks stored on the disk-based data storage device that are associated with the plurality of native data blocks each include a linear combination of the plurality of native data blocks.

In one embodiment, the multiple network coded blocks stored on the disk-based data storage device that are associated with the plurality of native data blocks each include a list of coefficients used to generate the corresponding linear combination.

In one embodiment, receiving a read request requesting retrieval of an innovative coded block includes receiving a read request requesting retrieval of a coded block that provides an additional degree of freedom that is useful in decoding previously retrieved coded blocks associated with the plurality of native data blocks.

In one embodiment, receiving, identifying, and reading are performed by a controller associated with the disk-based data storage device.

In one embodiment, the disk-based data storage device has at least N linearly-independent coded blocks stored therein, N being the number of native blocks within the plurality of native data blocks.

In one embodiment, the disk-based data storage device is a magnetic disk drive.

In accordance with another aspect of the concepts, systems, circuits, and techniques described herein, a method is provided for use in retrieving data from a disk-based data storage device having multiple network coded blocks stored therein that are associated with a plurality of native data blocks. More specifically, the method comprises: determining that the plurality of native data blocks need to be retrieved from the disk-based data storage device; and sending a read request to the disk-based data storage device requesting retrieval of an innovative coded block associated with the plurality of native data blocks.

In one embodiment, the method further comprises: receiving, in response to the read request, an innovative coded block associated with the plurality of native data blocks; temporarily storing the innovative coded block associated with the plurality of native data blocks in a memory; determining whether a sufficient number of innovative coded blocks associated with the plurality of native data blocks have been retrieved from the disk-based data storage device to enable decoding to extract the plurality of native data blocks; and if a sufficient number of innovative coded blocks associated with the plurality of native data blocks have not been retrieved from the disk-based data storage device to enable decoding, sending another read request to the disk-based data storage device requesting retrieval of an innovative coded block associated with the plurality of native data blocks.

In one embodiment, the method further comprises: repeating receiving, temporarily storing, determining, and sending another read request until a sufficient number of innovative coded blocks associated with the plurality of native data blocks have been retrieved from the disk-based data storage device to enable decoding.

In one embodiment, the method further comprises: decoding innovative coded blocks to extract native data blocks therefrom after a sufficient number of innovative coded blocks have been retrieved from the disk-based data storage device.

In one embodiment, the multiple network coded blocks stored on the disk-based data storage device that are associated with the plurality of native data blocks each include a linear combination of the plurality of native data blocks.

In one embodiment, the multiple network coded blocks stored on the disk-based data storage device that are associated with the plurality of native data blocks each include a list of coefficients used to generate the corresponding linear combination.

In accordance with still another aspect of the concepts, systems, circuits, and techniques described herein, a method is provided for storing data on a disk-based data storage device. More specifically, the method comprises: identifying a plurality of data blocks to be stored on the disk-based data storage device, the plurality of data blocks having N data blocks; generating a number of network coded blocks using the plurality of data blocks, each network coded block including a linear combination of the plurality of data blocks that is generated using a different set of random coefficients from the other network coded blocks; and writing the network coded blocks, with corresponding random coefficients, to individual block locations in the disk-based data storage device.

In one embodiment, identifying a plurality of data blocks to be stored on the disk-based data storage device includes: acquiring a file to be stored on the disk-based data storage device; dividing the file into a plurality of equal-sized block windows that each contain N data blocks; and selecting one of the plurality of equal-sized block windows.

In one embodiment, the method further comprises repeating generating and storing for each block window in the plurality of equal-sized block windows.

In accordance with a further aspect of the concepts, systems, circuits, and techniques described herein, a disk drive comprises: a drive controller; and at least one platter for storing digital data under the control of the drive controller; wherein the drive controller is configured to: (i) receive a read request requesting retrieval of an innovative coded block associated with a plurality of native data blocks from the at least one platter; (ii) identify, in response to the read request, an innovative coded block associated with the plurality of native data blocks stored on the at least one platter that is closest to a present position of a read transducer of the disk drive; and (iii) read the identified innovative coded block from the at least one platter.

In one embodiment, the identified innovative coded block read from at least one platter includes a linear combination of the plurality of native data blocks and a list of coefficients used to generate the linear combination.

In one embodiment, the at least one platter has at least N linearly-independent coded blocks stored thereon that are associated with the plurality of native data blocks, where N is the number of native data blocks within the plurality of native data blocks.

In accordance with a still further aspect of the concepts, systems, circuits, and techniques described herein, a system comprises: a processor; and a disk drive to store digital data for access by the processor; wherein the processor is configured to send a read request to the disk drive requesting retrieval of an innovative coded block associated with a group of native data packets.

In one embodiment, the processor is configured to continue to send read requests to the disk drive requesting retrieval of innovative coded blocks associated with the group of native data packets until enough innovative coded blocks have been retrieved to enable decoding.

In one embodiment, the disk drive comprises a drive controller configured to: (i) receive the read request requesting retrieval of an innovative coded block associated with a plurality of native data blocks; (ii) identify, in response to the read request, an innovative coded block associated with the plurality of native data blocks stored in the disk drive that is closest to a present position of a read transducer of the disk drive; and (iii) read the identified innovative coded block using the read transducer.

In one embodiment, the drive controller is configured to identify the innovative coded block that is closest to the present position of the read transducer by selecting a stored coded block that will take a least amount of time to access.

In one embodiment, the drive controller is configured to identify the innovative coded block that is closest to the present position of the read transducer by selecting a stored coded block that is physically closest to the read transducer.

In one embodiment, the drive controller is configured to ignore coded blocks associated with the plurality of native data blocks that have recently been retrieved when identifying an innovative coded block that is closest to the present position of the read transducer.

In one embodiment, the disk drive comprises a drive controller configured to: (i) acquire a plurality of data blocks to be stored in the disk drive, the plurality of data blocks having N data blocks; (ii) generate a number of network coded blocks using the plurality of data blocks, each network coded block including a linear combination of the plurality of data blocks that is generated using a different set of random coefficients from the other network coded blocks; and (iii) write the generated network coded blocks, with corresponding random coefficients, to individual block locations on one or more platters of the disk drive.

BRIEF DESCRIPTION OF THE DRAWINGS

The foregoing features may be more fully understood from the following description of the drawings in which.

DETAILED DESCRIPTION

Coding has long been used in hard disk drives for error correction within single blocks. Codes such as, for example, Reed-Solomon codes, low density parity check (LDPC) codes, and others are among the most commonly used in disk drives. However, coding has not been used to reduce I/O latency in hard drives. Techniques and systems are described herein that use coding to reduce average access times in hard disk drives and other data storage devices that have moving mechanical parts. The techniques and systems may be used in addition to, or as a replacement for, read-ahead algorithms and other I/O latency reduction algorithms.

Figure 1:
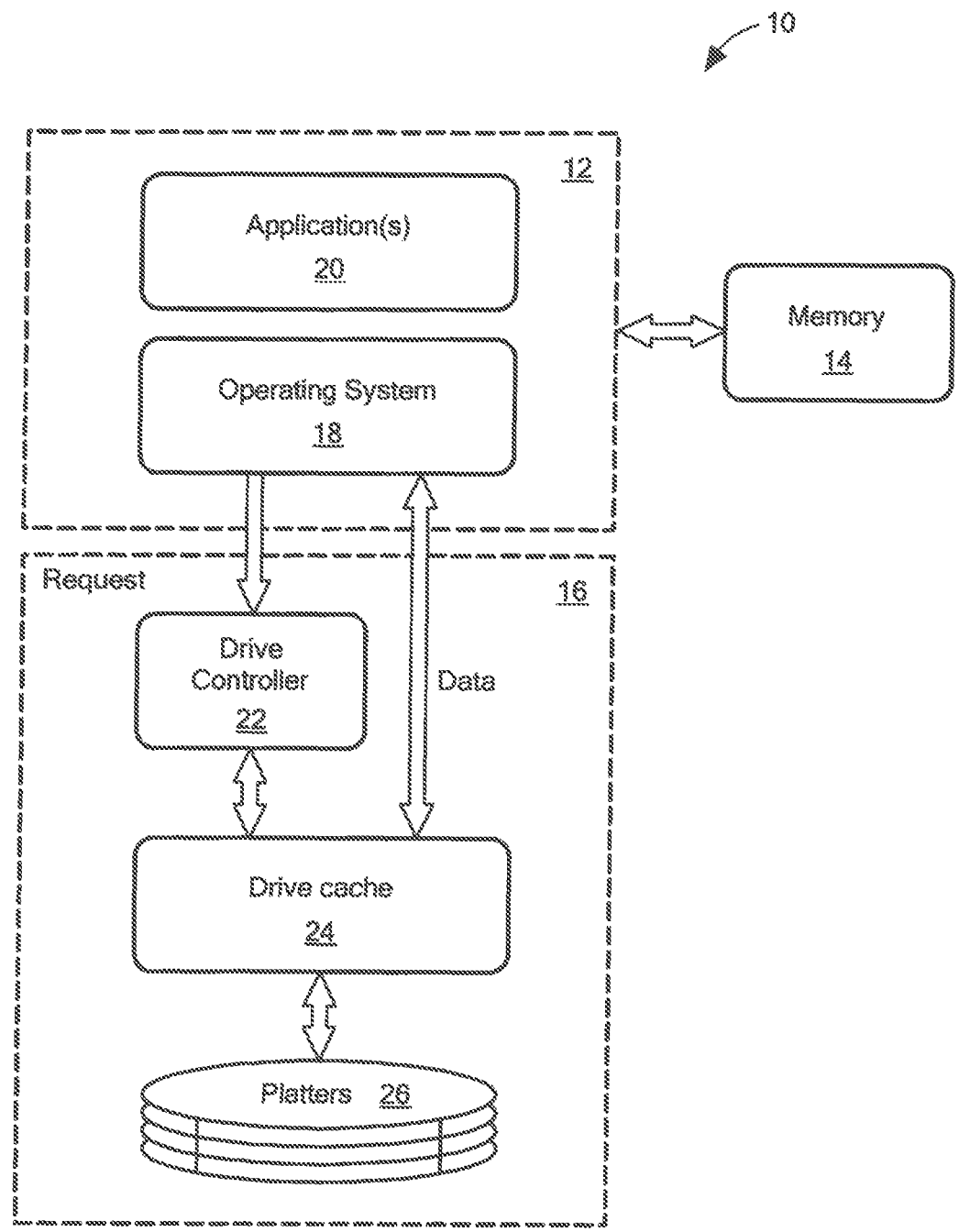
FIG. 1 is a block diagram illustrating an exemplary computing system that may incorporate features described herein.

FIG. 1 is a block diagram illustrating an exemplary computing system 10 that may incorporate features described herein. As illustrated, the computing system 10 may include, for example, a digital processor 12, memory 14, and a disk drive 16. The digital processor 12 may use the disk drive 16 to store, for example, program files and data files in a nonvolatile form. The digital processor 12 may use the memory 14 to store, for example, programs that are currently being executed by the processor 12. As illustrated, digital processor 12 may execute an operating system 18 to control the overall operation of the system 10. Digital processor 12 may also execute one or more application programs 20. The digital processor 12 may include any type of processor that is capable of processing computer instructions including, for example, a general purpose microprocessor, a digital signal processor (DSP), a reduced instruction set computer (RISC), a microcontroller, and/or others, including combinations of the above.

As shown in FIG. 1, the disk drive 16 may include: a drive controller 22, a drive cache (or buffer) 24, and one or more platters 26. The drive controller 22 controls the operation of the disk drive 16. As such, the drive controller 22 may include one or more digital processing devices. The platters 26 are the storage media where the digital data is stored within the disk drive 16. In a magnetic disk drive (e.g., a hard disk drive, etc.), each of the platters 26 may be coated with a magnetic material that allows digital data to be stored thereon in a magnetic form (e.g., as magnetic polarity inversions or some other magnetic indicia). Data is typically stored within concentric tracks on the surfaces of the platters 26, although other schemes also exist. Data may be stored on one or both sides of each platter 26. A disk drive may include only a single platter, but typically a number of platters will be stacked one above the other on a central spindle that serves as an axis of rotation for the platters 26 during disk drive operation. Read and write elements may be used as transducers to read data from and write data to the tracks of the platters 26.

The drive cache 24 may be used as a data buffer between the platters 26 and an exterior device (e.g., processor 12, etc.) during read and write operations. Drive cache 24 may thus operate to provide, among other things, temporary data storage for read and/or write data to compensate for a difference in data rate between a read/write channel associated with the platters 26 and an input/output port of the drive 16. The drive cache 24 will typically be able to store a maximum of C blocks at any given time.

Each active platter surface within a disk drive will typically have one read element and one write element associated therewith. In some cases, a single element may be used to perform both reading and writing for a platter surface, but typically separate read and write elements will be provided (although they may both be part of the same read/write head). The read and write elements are usually coupled to the end of a moveable actuator arm that allows them to be controllably positioned with respect to the surface of the corresponding platter. A voice coil motor or other type of motor may be used to move the actuator arm under the control of the drive controller 22. Data is usually stored on disk drive platters in fixed length blocks that are at known locations on the platter surface (i.e., a known point on a corresponding track). Servo information may also be provided on the surface of the disk platter for use in positioning the read or write element during corresponding access operations.

During disk drive operation, the platters 26 are rotated about the central axis at a predetermined rate. Typically, the drive controller 22 will receive a read or write request from an external source (e.g., from operating system 18 of processor 12, etc.) and will carry out the request by reading a block of data from the drive (for a read request) or writing a block of data to the drive (for a write request). For both read and write requests, the drive controller 22 will first cause the corresponding read or write element to seek to the appropriate track. After the element is centered on the track, the drive controller will wait for the platter to rotate a sufficient amount to place the desired block location (or sector) of the track under the read or write element and then allow the data to be read from or written to the block location.

A disk drive is typically a random access storage device. That is, at any time, a single data block may be read from or written to any block location or sector on any of the active platter surfaces. In one disk drive standard, known as the Advanced Format Standard, the individual data blocks are of size 4096 bytes. Other sizes may be used in other standards. In a common write technique, a data file to be stored on a disk drive may be divided into a plurality of blocks, each having the appropriate block size. For example, a single file f may be decomposed into a set of $\{f_i\}_{i=1}^{M}$ data blocks. The individual blocks may then be stored to available block locations on the disk platters. A record will be maintained that tracks the locations of the various blocks associated with the file on the disks. In many cases, the available block locations on the platter surfaces may not all be grouped together. Thus, the locations where the blocks are stored on the disk surfaces will not necessarily be near one another. That is, the blocks associated with the file may, in some cases, be distributed across the surfaces of one or more platters.

In a common read scenario, the drive controller 22 will receive block requests from the operating system 18 at an input thereof. When a read request arrives at the controller 22 for a block $f_i$, the controller 22 may first check whether or not $f_i$ is currently located in the drive cache 24. If it is, the controller 22 will cause the block $f_i$ to be transferred from the cache 24 to the operating system 18 in response to the request. This may be considered an instantaneous transfer in comparison to a typical disk read operation and can speed up the read process considerably. If block $f_i$ is not located in the cache 24, then the block will be read from the platters 26 with a random block access-time T. The block access-time T may be expressed as:

$$T = wR_1 + R_2 + e \qquad (1)$$

where $R_1$ is the rotational latency, $R_2$ is the seek time, $w \epsilon R$ is the ratio between the speed of angular rotation of the platter and the rotational movement of the head, and e is the controller processing and block read-out time. Using this approach, the read process can be modeled as a GI/G/1/D queue, where D is a function of the cache size and the average service rate is given by 1/E[T]. As can be appreciated, if the blocks associated with a file are randomly distributed across the platters of a disk drive, the process of individually reading all of the blocks associated with the file from the disk drive can be very time consuming.

In various embodiments described herein, network coding is used to store data to the platters of a disk drive in a manner that allows read operations to be performed in a faster, more efficient manner. This read technique may be referred to as coded seeking. Instead of storing the raw data blocks $f_i$ associated with a file f to corresponding locations on the platter surfaces, network coded blocks of data associated with the file are stored. Network coding is a technique where data is encoded by generating linear combinations of data elements. These linear combinations may later be "decoded" to extract the original data elements. The decoding process typically requires that a sufficient number of linear combinations (and/or original data elements) be available as "degrees of freedom" to solve for the original data elements using linear techniques.

One popular form of network coding is known as random linear network coding (RLNC). Using RLNC, data elements are linearly combined using randomly generated coefficients. If different sets of randomly generated coefficients are used to generate different linear combinations of the same data elements, the resulting linear combinations will typically be linearly independent of one another (i.e., they will be innovative) and will thus each represent a degree of freedom that may be used in decoding.

In one possible technique for coded storage, a file f may be separated into L equal-sized "block windows" or generations that each contain r data blocks. The Lth block window of the file may be referred to as $B_l$. Block window $B_l$ may include a subset of the file's block indices and be disjoint from all other block windows associated with the file. A coded block $c_i$ may be generated for block window $B_l$, as follows:

$$c_i = \Sigma_{\kappa \in B_l} \alpha_\kappa f_\kappa \qquad (2)$$

where $\alpha_\kappa$ are random coefficients and $f_\kappa$ are the data blocks associated with block window $B_l$. A number of different coded blocks $c_i$ may be generated for each block window $B_l$. The coefficients $\alpha_\kappa$ may be drawn from a finite field $F_q$ of size q, such that the individual coded blocks $c_i$ associated with a block window $B_l$ are linearly independent of one another with high probability and in some cases certainty. Each coded block $c_i$ will thus provide partial information on all data blocks in the corresponding block window. The coded blocks associated with each block window of the file f will be stored to the platters of the disk drive. The number of coded blocks $c_i$ that are generated and stored for each block window will be at least a number required to solve for all of the data blocks of the block window, but it could be more than this number. The coefficients $\alpha_\kappa$ used to generate each coded block may be stored on the disk surfaces in association with the coded block (e.g., as meta data or in some other manner).

When the operating system 18 eventually wants to read the file f from the disk drive 16, it may read each of the block windows from the disk drive 16 one by one until all block windows have been recovered. For each block window, the operating system 18 will send read requests to the drive controller 22 asking for innovative coded blocks (or degrees of freedom) associated with the block window. For each read request, the drive controller 22 may retrieve one coded block along with the coefficients associated with the coded block. The operating system 18 may continue to send requests for innovative coded blocks until a sufficient number of degrees of freedom have been retrieved to decode the data blocks of the block window. Any technique for decoding network coded data blocks may be used to decode the coded blocks. In at least one implementation, a progressive decoding technique may be used by the operating system 18 to decode coded blocks as they are received, such as Gauss-Jordan elimination or a similar technique. Other techniques may alternatively be used. As will be described in greater detail, the techniques used by the drive controller 22 to retrieve the coded blocks (or degrees of freedom) can speed up the overall retrieval of the file f considerably.

The drive controller 22 may have a record of the locations on the platters of all coded blocks associated with each block window of each stored file. When a read request for an innovative coded block associated with a particular block window of a particular file is received, the drive controller 22 may determine which of the corresponding coded blocks stored on the platters is closest to a current position of a read head of the disk drive 16. The drive controller 22 may then seek to the corresponding track on the corresponding platter surface and read that coded block. When a next read request for an innovative coded block associated with the same block window of the same file is received, the drive controller 22 may determine which of the other corresponding coded blocks stored on the platters is closest to the current position of the read head of the disk drive 16. The same procedure may then be repeated for each new request. Thus, in some implementations, the drive controller 22 may keep track of recently retrieved data so that the same coded block associated with a given block window is not sent twice to the operating system during the same file read operation (this is because the same coded block read a second time will not provide a new degree of freedom for use in decoding). Because the "closest" coded block is used for each read request, a significant amount of seek and latency time may be avoided during a file read operation.

In some implementations, the drive controller 22 may first determine whether an innovative coded block associated with the identified block window is currently stored within the drive cache 24 before retrieving a coded block from the platters. If there is a coded block associated with the identified block window in the drive cache 24, and the coded block has not already been sent to the operating system 18 during the current file read operation, then the coded block may be sent from the drive cache 24 to the operating system 18 in response to the read request.

Figure 2:
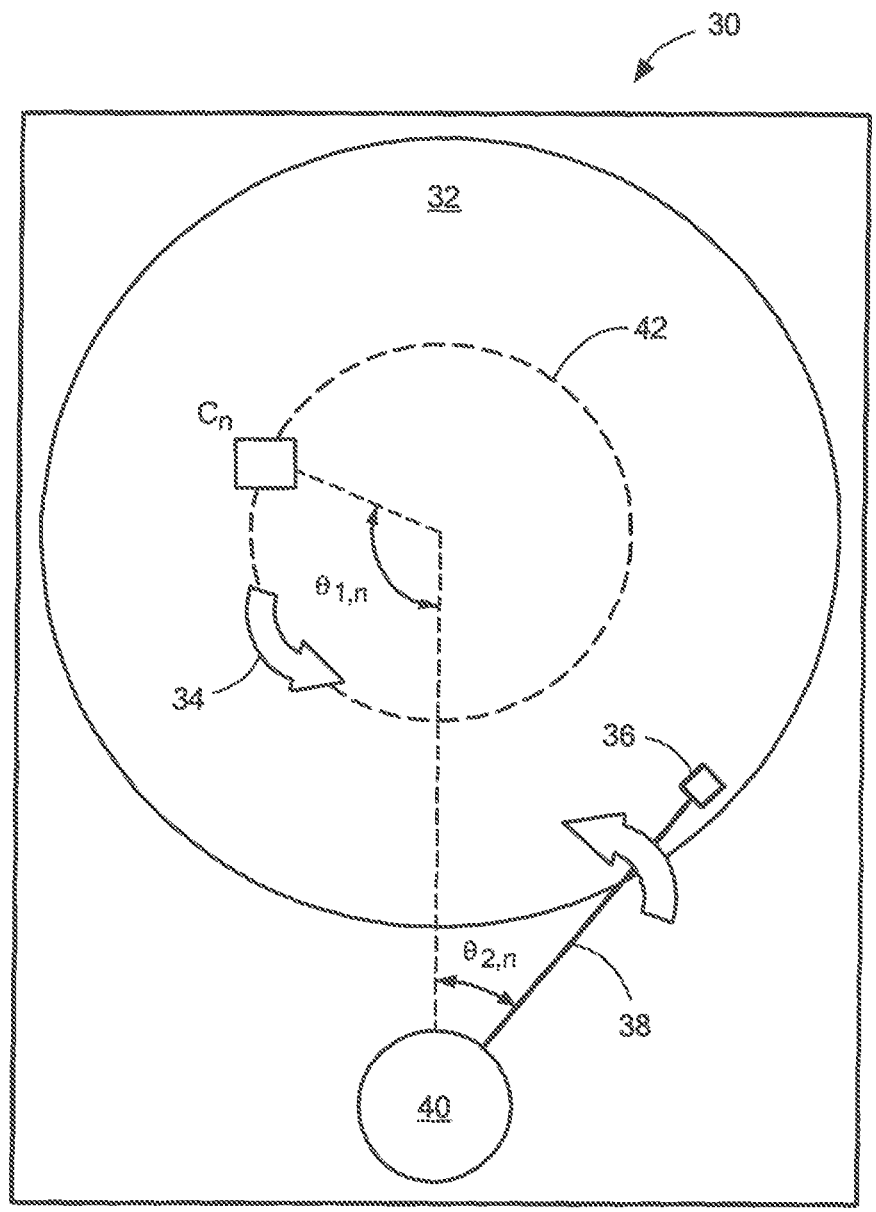
FIG. 2 is a top view of an exemplary disk drive that may incorporate features described herein.

In a typical scenario, when the operating system 18 sends a request for a degree of freedom for a block window $B_l$, the read head and platters of the corresponding disk drive will be in a random physical orientation with respect to one another. FIG. 2 is a top view of a disk drive 30 showing such a situation. As illustrated, disk drive 30 includes a platter 32 that is rotating in a direction 34, a read element 36 coupled to the end of an actuator arm 38, and a voice coil motor 40 to pivot the actuator arm 38 about an axis under the control of the disk controller. When the read request is received, the read element 36 may be in a random position with respect to the various coded blocks stored on the platter. The drive controller may then determine which of the various coded blocks on the platter is closest to the current position of the read element 36. In different embodiments, the term "closest" can mean either physically closest (i.e., shortest distance between coded block and read element) or closest in time (i.e., the block the read element can be moved to the soonest). Techniques to find the closest block may include computing the distance or time required to travel to each block in a list and finding the minimum element from that list. The distance or time calculations would be based on the current location of the head and the physical location of each block. To compute the order to access all blocks in a window optimally, a solution or approximate solution of the well known Traveling Salesman Problem (TSP) may be sought. More specifically, each block may be considered an element in an undirected weighted graph. The potential head and platter movements can then be modeled as paths in the graph, with weights being a function of distance or time to travel.

After a closest coded block $c_n$ has been identified, the drive controller may cause the actuator arm 38 to pivot until the read element 36 is centered above and following a track 42 associated with the coded block (this is known as a seek operation). The drive controller may use servo information read from a surface of the platter 32 to track a current position of the read element 36 during this process. Once the read element 36 is on the appropriate track 42, the drive controller will wait until the platter 32 turns to a point where the read element 36 is above the desired coded block $c_n$. The time delay between the read element reaching the track 42 and the desired coded block reaching the read element 36 is known as the rotational latency. When the read element 36 reaches the desired coded block on track 42, the drive controller may read the coded sector (and the corresponding coefficient information) from the platter surface. This process may then be repeated for each other coded block to be read.

As described previously, in many cases, the coded blocks associated with a block window may be spread randomly on one or more platter surfaces. As each read request is received, the disk controller may select and retrieve the next "closest" innovative coded block stored in the drive. Using the same form as equation (1) above, the random access time $T_n$ for the nth coded block (or nth degree of freedom) may be expressed as:

$$T_n = wR_{1,n} + R_{2,n} + e, \qquad (3)$$

where $R_{1,n}$ is the rotational latency for the nth coded block and $R_{2,n}$ is the seek time for the nth coded block.

As described above, when a read request is received, the drive controller may determine which coded block is closest to the read element and then read that coded block. The time required to move the read element to the beginning of this block is linearly related to both the angle the actuator arm must turn to align the read element with the track of the coded block and the distance the read element must then move along this track to the beginning of the coded block of interest. In one possible approach, the parameter $\theta_{2,n}$ (see FIG. 2) may be expressed as the proportion of a full range of motion that the actuator arm 38 must turn to position the read element above the relevant track 42 for the nth coded block $c_n$ and the parameter $\theta_{1,n}$ may be expressed as the proportion of a full rotation that the platter 32 must turn to read out the nth coded block $c_n$ once on the relevant track 42.

If $R_1$ and $R_2$ are assumed to refer to the same coded block, and if the rotational latency and the seek time for each block are statistically independent, then for the first coded block associated with a block window, $R_{1,1}$ and $R_{2,1}$, the access-time $T_1$ may be computed as:

$$R_{1,1} = \min(\theta_{1,1}, \ldots, \theta_{1,r}) \qquad (4)$$

and $$R_{2,1} = \min(\theta_{2,1}, \ldots, \theta_{2,r}). \qquad (5)$$

where the minima apply to the same coding block. Since both $R_{1,1}$ and $R_{2,1}$ are minima of a fixed number of uniform random variables, their PDF have the common form:

$$f(r_{i,1}) = r(1 - r_{i,1})^{r-1}. \qquad (6)$$

The expected value of $T_1$ is then given by:

$$E[T_1] = \frac{w+1}{r+1} + E[e]. \qquad (7)$$

Figure 3:
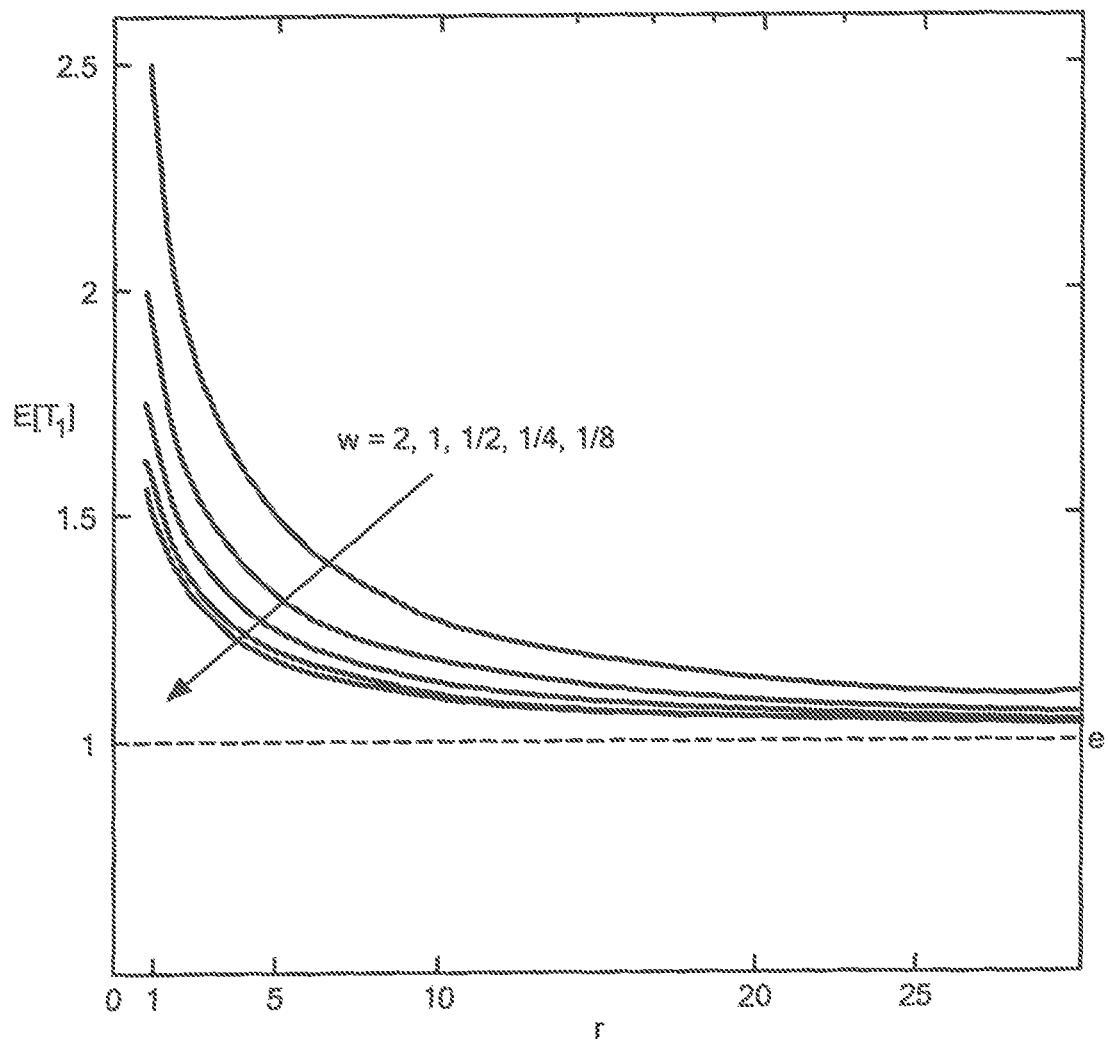
FIG. 3 is an exemplary plot illustrating how an expected value of a data access time of a coded block ($E[T_1]$) may vary with a number of native data blocks r used to generate the coded blocks for different values of w in accordance with an embodiment.

Therefore, as r increases, the speed of the disk drive in accessing random degrees of freedom also increases. It should be noted that as r tends toward infinity, the value of $E[T_1]$ tends toward $E[e]$. In modern hard disk drives, the seek time and rotational latency can account for approximately two-thirds of total read time. Therefore, in practical systems, it is possible that significant speed gains can be achieved using the described techniques. FIG. 3 is a plot illustrating how $E[T_1]$ varies with r for a number of different values of w.

As described above, the coded blocks associated with a block window may be stored on a single platter surface of a disk drive or on multiple platter surfaces. If multiple platter surfaces are used, similar techniques may be used to identify a coded block that is closest to a present location of a read element. That is, a coded block may be selected for a next read operation that will minimize an access time for the operation.

Figure 4:
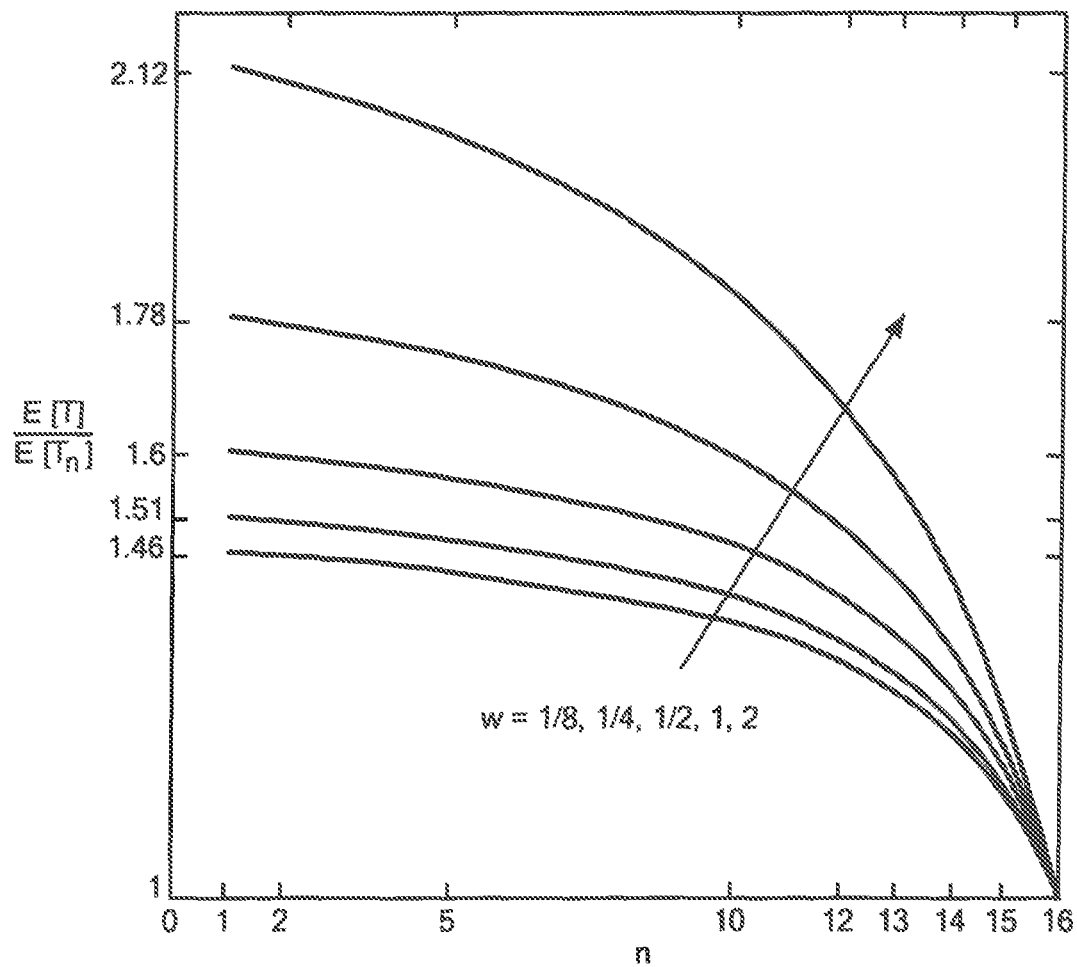
FIG. 4 is a exemplary plot illustrating how $E[T]/E[T_n]$ may vary as a disk drive implementing coded seeking moves along a block window's degrees of freedom in accordance with an embodiment.

If content is coded across r blocks, then all r blocks need to be accessed for the corresponding block window to be decoded. In general, coded-seeking gains will be greatest for the first degree of freedom accessed and will decrease for subsequent degrees of freedom. For the last degree of freedom, the coded seeking system access-time may be equivalent to the uncoded scheme. The ratio $E[T]/E[T_n]$ may be used as a metric for gauging the speed-up gains that diminish with n. As an approximation, the parameter r may be substituted for r−n+1 in equation (7) above. FIG. 4 is an exemplary plot illustrating how $E[T]/E[T_n]$ may vary as a disk drive moves along a block window's degrees of freedom.

The speed-up of the seek-time may have additional benefits, including reducing blocking probability. In particular, if we model the disk drive as a GI/G/1/D queue, then for an uncoded system we have a blocking probability $P_b^U$ proportional to:

$$P_b^U \propto \frac{E[T]\lambda\lambda_1 \ldots \lambda_{D-1}}{\mu_1 \ldots \mu_{D-1}}, \qquad (8)$$

where $\lambda_i$ and $\mu_i$ are the ith moment for arrival and service rates, respectively. The equivalent coded seeking blocking probability $P_b^C$ for the first degree of freedom is then proportional to:

$$P_b^C \propto P_b^U \frac{(w+1)/(r+1) + E[e]}{(w+1)/2 + E[e]} \qquad (9)$$

$$\approx \frac{2}{r+1} P_b^U \qquad (10)$$

if $E[e]$ is small.

The speed-up of hard disk drives and the reduction in blocking probability that are made possible through the use of coded seeking tend to reduce the dependence on physically moving parts within a disk drive. In various embodiments, this technique may require the operating system to store multiple coded blocks and decode the blocks when sufficient degrees of freedom have been read. In essence, work originally done by the disk drive is transferred to either the operating system or the drive controller and can thus be performed using fast RAM or the fast cache, respectively. The benefits of coded seeking are most apparent when requests are uniformly random. When there is more structure to requests, the advantages of coded seeking may be outweighed by the disadvantages of having to perform coded writing. The size of the block window that is used to perform coded seeking can affect the overall benefit of the technique. If the block window is too small, for example, the benefits of coded seeking will diminish. If the block window is too large, the decoding delay may increase. The best block window size to use in a particular system will be related to the storage unit size, the file size, and the operating system timing and delay guarantee requirements.

Figure 5:
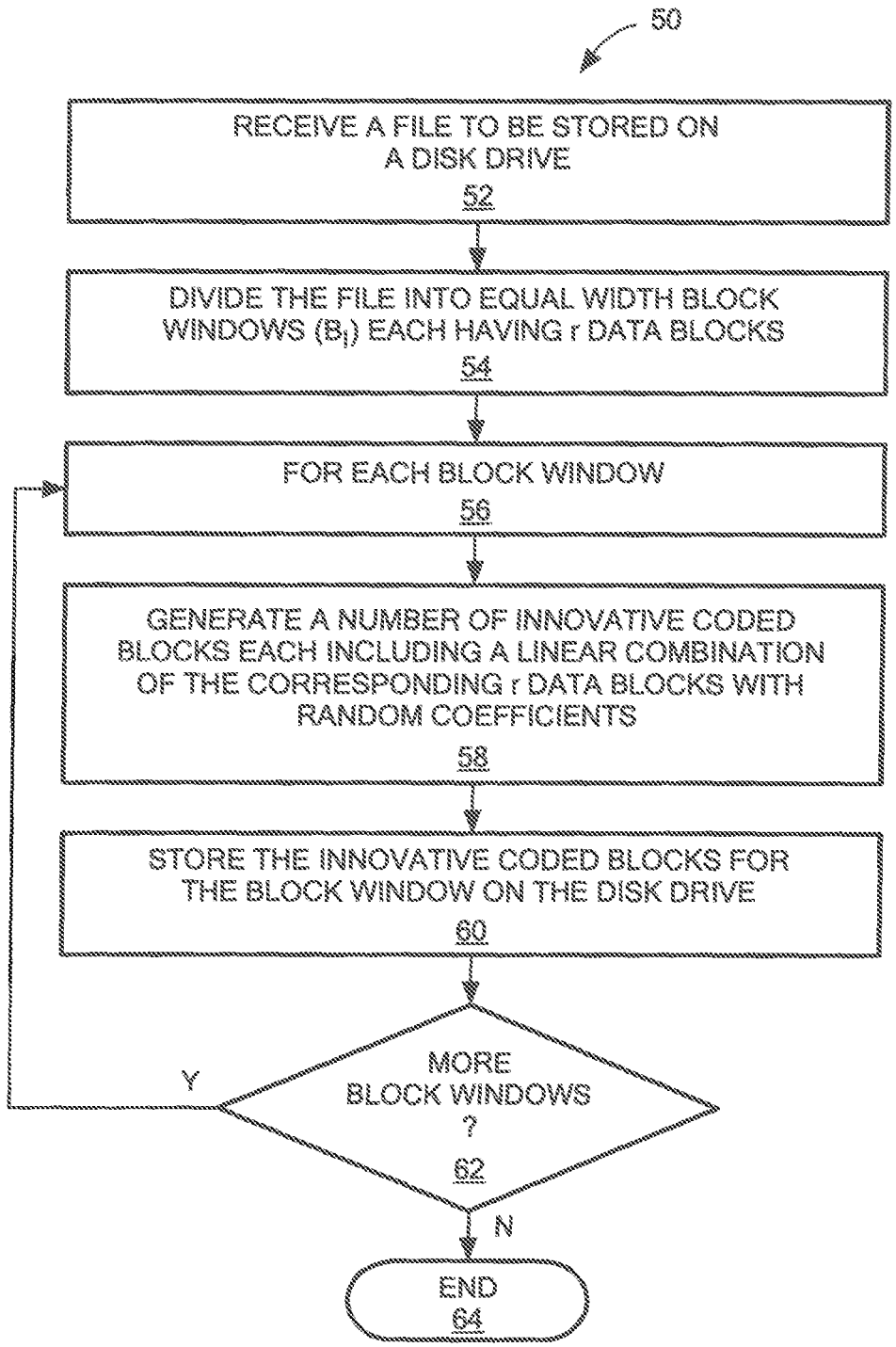
FIG. 5 is a flow diagram illustrating a method for storing data on a disk drive using network coding in a manner that supports coded seeking in accordance with an embodiment.
Figure 6:
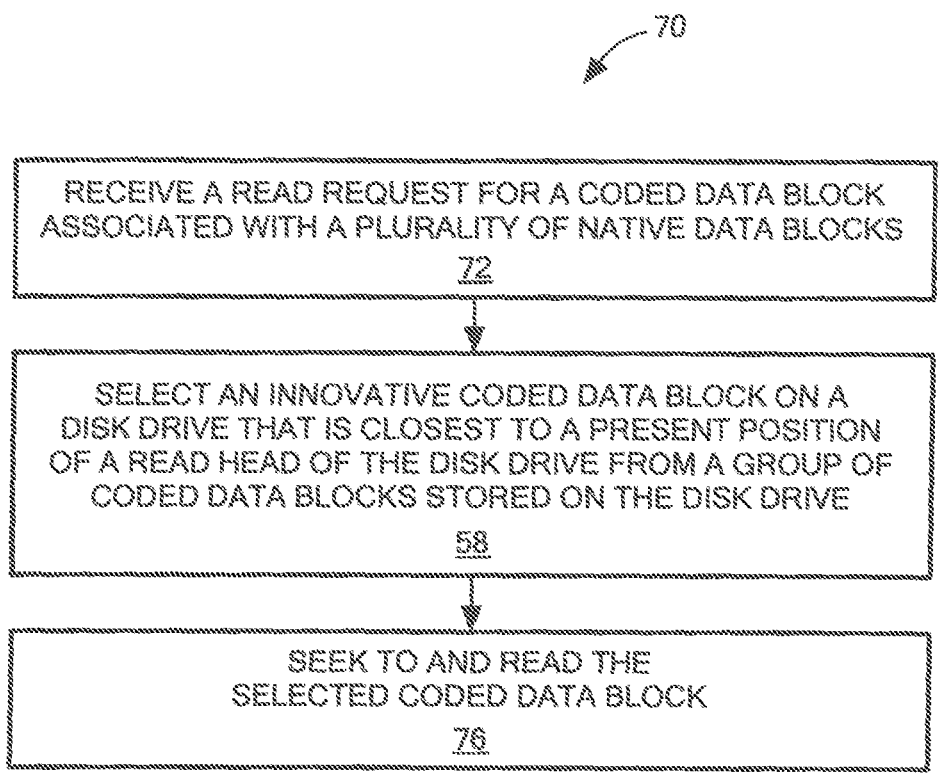
FIG. 6 is a flow diagram illustrating a method for use in retrieving data from a disk drive using coding seeking in accordance with an embodiment.
Figure 7:
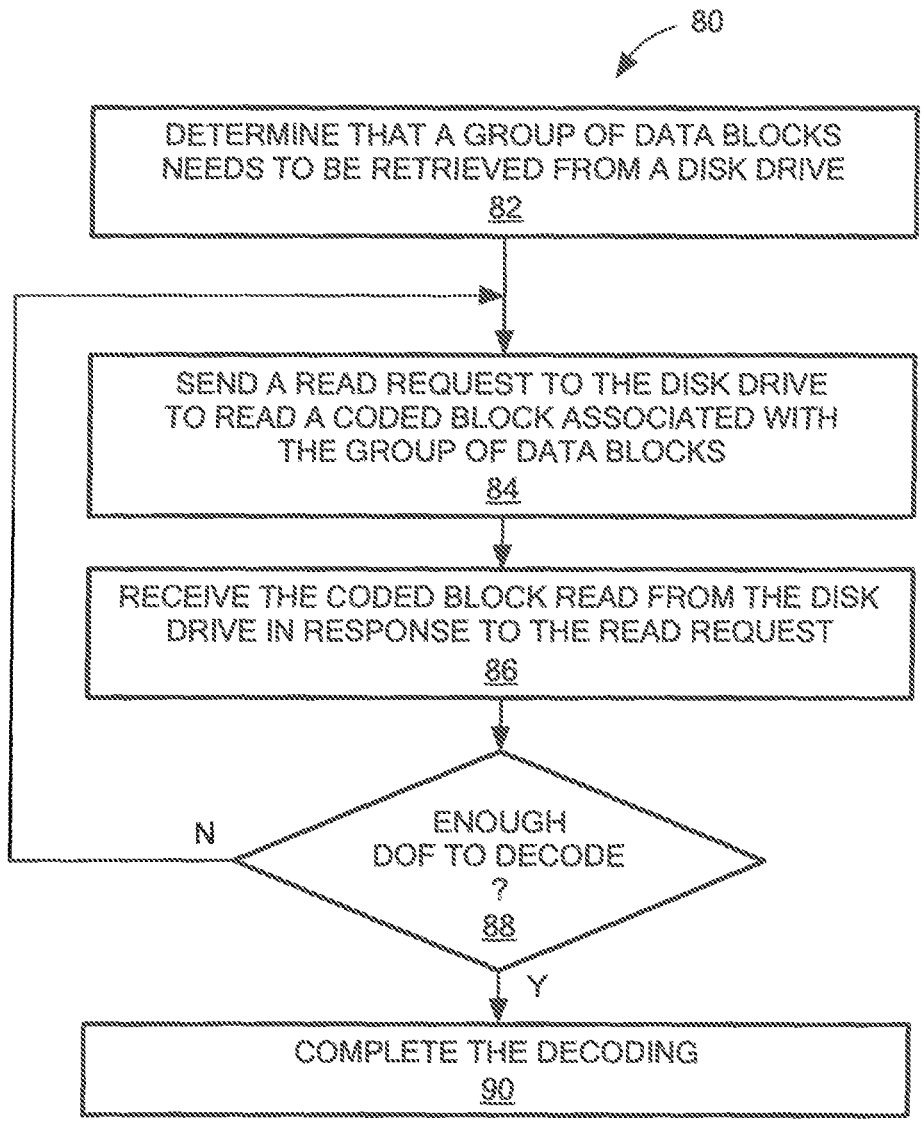
FIG. 7 is a flow diagram illustrating a method for use in retrieving data from a disk drive that supports coding seeking in accordance with an embodiment.

FIGS. 5, 6, and 7 are flow diagrams showing various example processes for implementing coded seeking in a disk drive in accordance with embodiments.

The rectangular elements in the flow diagrams (typified by element 52 in FIG. 5) are herein denoted "processing blocks" and may represent computer software instructions or groups of instructions. It should be noted that the flow diagrams of FIGS. 5, 6, and 7 represent exemplary embodiments of a design described herein and variations in such a diagram, which generally follow the process outlined, are considered to be within the scope of the concepts, systems, and techniques described and claimed herein.

Alternatively, the processing blocks may represent operations performed by functionally equivalent circuits such as, for example, a digital signal processor circuit, an application specific integrated circuit (ASIC), or a field programmable gate array (FPGA). The flow diagrams do not depict the syntax of any particular programming language. Rather, the flow diagrams illustrate the functional information one of ordinary skill in the art may require to fabricate circuits and/or to generate computer software to perform the corresponding processing. It should be noted that many routine program elements, such as initialization of loops and variables and the use of temporary variables, are not shown. It will be appreciated by those of ordinary skill in the art that, unless otherwise indicated herein, the particular sequences described are illustrative only and can be varied without departing from the spirit of the concepts described and/or claimed herein. Thus, unless otherwise stated, the processes described below are unordered meaning that, when possible, the sequences shown in FIGS. 5, 6, and 7 can be performed in any convenient or desirable order.

FIG. 5 is a flow diagram illustrating a method 50 for storing data on a disk drive using network coding in a manner that supports coded seeking in accordance with an embodiment. The method 50 may be implemented in connection with, for example, an operating system, a disk drive controller, or some other processor or controller associated with a data storage device, system, or network. In some embodiments, the acts associated with method 50 may be carried out using multiple processors and/or controllers operating together. A file that is to be stored on a disk drive may first be received or identified (block 52). The file may be divided into a plurality of equal-width block windows $B_i$ that each have r data blocks (block 54). For each of the block windows, a number of innovative coded blocks may be generated using network coding techniques (block 56, 58). Each of the coded blocks may include a linear combination of the corresponding r data blocks that are made using random coefficients so that the coded blocks are linearly independent of one another. In general, r or more coded blocks may be generated for each block window. The coded blocks generated for each block window may then be stored on the disk drive (block 60). This process may be repeated until all of the block windows of the original file have been processed and stored (block 62, 64). Other or modified techniques for writing coded data onto a disk drive in support of coded seeking may alternatively be used. For example, in one such approach, a file may be simply be divided into r data blocks without first forming blocks windows. The r data blocks may then be used to generated coded blocks for storage.

FIG. 6 is a flow diagram illustrating a method 70 for use in retrieving data from a disk drive using coding seeking in accordance with an embodiment. The method 70 may be implemented in connection with, for example, an operating system, a disk drive controller, or some other processor or controller associated with a data storage device, system, or network. In some embodiments, the acts associated with method 50 may be carried out using multiple processors and/or controllers operating together. A read request is first received that requests an innovative coded data block (or degree-of-freedom) associated with a plurality of native data blocks (block 72). The plurality of native data blocks may include, for example, a plurality of blocks associated with a particular block window of a data file or some other group of native data blocks. An innovative coded data block that is associated with the plurality of native data blocks is next selected that is closest to a present position of a read head of the disk drive (block 74). The innovative coded data block may be selected from a group of such coded blocks that are known to be associated with the plurality of native data blocks. The disk drive may then cause a read element to move to the location of the selected coded data block and read the coded block (block 76). This process may be repeated for each new read request that is received for an innovative coded data block associated with the plurality of native data blocks. In some implementations, coded data blocks associated with the plurality of native data blocks that were recently read during a common data read process (e.g., during a read operation for a particular file) are ignored during the selection process so that the coded data block retrieved from the drive in response to the current read request is linearly independent of previously retrieved coded blocks.

FIG. 7 is a flow diagram illustrating a method 80 for use in retrieving data from a disk drive that supports coding seeking in accordance with an embodiment. The method 80 may be performed in connection with, for example, an operating system of a computing system that uses the disk drive to store data in a non-volatile form or some other processor or controller associated with the disk drive. It is first determined that a group of native data blocks needs to be retrieved from the disk drive (block 82). In some implementations, the group of native data blocks may represent a block window associated with a data file stored on the data storage device, although other groups of data blocks may alternatively be used. In some embodiments, only a single data block within the group of data blocks may be of interest, but the entire block will need to be retrieved and decoded to have access to the desired block. A read request may next be sent to the disk drive requesting that an innovative coded block (or degree of freedom) associated with the group of data blocks be read (block 84). The coded block read from the disk drive in response to the request is subsequently received from the disk drive and temporarily stored in a memory (block 86). It may next be determined whether enough innovative coded blocks (or degrees-of-freedom) have been retrieved from the disk drive to extract the group of native data blocks from the coded blocks (block 88). If not (block 88-N), another read request may be sent to the disk drive requesting that an innovative coded block associated with the group of data blocks (block 84) and the process is repeated. This process may continue until a sufficient number of innovative coded blocks have been retrieved to enable decoding (block 88-Y). At this point, the innovative coded blocks may be decoded (block 90). In some implementations, this may comprise a full decoding operation that uses all of the retrieved coded blocks. In implementations where progressive decoding is used, this may comprise perform a last step of a decoding process.

Although described above in the context of a magnetic hard disk drive, it should be appreciated that many of the features described herein may be used in connection with other data storage devices that include one or more moving parts including, for example, other disk based stored devices (e.g., CDROMs, DVDs, BluRay® discs, etc.).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for use in retrieving data from a storage device having multiple network coded blocks stored therein that are associated with a plurality of native data blocks, the method comprising:
   determining that the plurality of native data blocks need to be retrieved from the storage device; and
   sending a read request to the storage device requesting retrieval of an innovative coded block associated with the plurality of native data blocks.

2. The method of claim 1, further comprising:
   receiving, in response to the read request, an innovative coded block associated with the plurality of native data blocks;
   temporarily storing the innovative coded block associated with the plurality of native data blocks in a memory; and
   if a sufficient number of innovative coded blocks associated with the plurality of native data blocks have not been retrieved from the storage device to enable decoding, sending another read request to the storage device requesting retrieval of an innovative coded block associated with the plurality of native data blocks.

3. The method of claim 2, further comprising:
   repeating receiving, temporarily storing and sending another mad request until a sufficient number of innovative coded blocks associated with the plurality of native data blocks have been retrieved from the storage device to enable decoding.

4. The method of claim 3, further comprising:
   decoding innovative coded blocks to extract native data blocks therefrom after a sufficient number of innovative coded blocks have been retrieved from the storage device.

5. The method of claim 4, wherein:
   the multiple network coded blocks stored on the storage device that are associated with the plurality of native data blocks each include a linear combination of the plurality of native data blocks.

6. The method of claim 5, wherein:
   the multiple network coded blocks stored on the storage device that are associated with the plurality of native data blocks each include a list of coefficients used to generate the corresponding linear combination.

7. A method for storing a file to a hard disk drive (HDD), the method comprising:
   receiving a file having a plurality of blocks;
   dividing the file into a plurality of block windows, each block window associated with a subset of the file's blocks disjoint from the file blocks associated with every other block window;
   for each block window, generating a plurality of coded blocks from the associated file blocks; and
   writing the coded blocks to the hard disk drive.

8. The method of claim 7 wherein each of the block windows is associated with an equal number of file blocks.

9. The method of claim 7 wherein, for each block window, generating a plurality of coded blocks comprises combining the associated file blocks using a vector of coding coefficients associated with the block window.

10. The method of claim 9 wherein, for each block window, the associated coding coefficients are selected such that coded blocks generated for the block window are linearly independent of one another with high probability.

11. The method of claim 9 wherein, writing the coded blocks to the hard disk drive comprises, for each coded block, writing a corresponding vector of coefficients to the hard disk drive.

12. A method for reading a file from a hard disk drive (HDD), the method comprising:
   determining the location of a plurality of coded blocks stored upon a hard disk drive (HDD) and associated with a file;
   selecting a first one of the coded blocks to read;
   reading the first coded block and a corresponding first vector of coefficients from the HDD;
   based in part upon the first vector of coefficients, selecting a second one of the coded blocks to read; and
   reading the second coded block and a corresponding second vector of coefficients from the HDD.

13. The method of claim 12 wherein selecting a first one of the coded blocks to read comprises determining the coded block physically closest to a HDD head.

* * * * *